Oct. 1, 1968    R. CARNES    3,403,614
ENVIRONMENTAL ENCLOSURE WITH CEILING AIR PLENUM
Filed April 28, 1967

INVENTOR
RANDALL CARNES

BY Ernest J. Hy

ATTORNEY

United States Patent Office 3,403,614
Patented Oct. 1, 1968

3,403,614
ENVIRONMENTAL ENCLOSURE WITH CEILING AIR PLENUM
Randall Carnes, New Lebanon, Ohio, assignor to The Bendix Corporation, a corporation of Delaware
Filed Apr. 28, 1967, Ser. No. 634,545
2 Claims. (Cl. 98—40)

ABSTRACT OF THE DISCLOSURE

An environmentally controlled enclosure having a plenum chamber into which conditioned air is introduced for uniform distribution into the enclosure. The lower plenum boundary, which is the enclosure ceiling, is perforated to provide air flow into the enclosure. Enclosure illumination is provided through light units within the plenum chamber and provision is made for evenly distributing heat generated by said light units.

Background of the invention

This invention relates generally to environmentally controlled enclosures, and more specifically to improved means for air distribution, pressurization and controlling radiant heat from light units in environmentally controlled enclosures.

An increasing number of industries have come to rely on environmentally conditioned work areas for laboratory experiments, precision gaging and the manufacture of precision parts, the assembly of minute mechanisms, or any situation requiring precise temperature control. Numerous environmentally controlled enclosures are available to meet industry's needs. An example of a preferred type is disclosed in Mahlmeister et al. Patent 3,115,819.

However, there have been problems in many environmentally controlled enclosures of a non-uniformity of temperature within the enclosure resulting in so-called "hot spots" or "cold spots" relative to the rest of the room. These spots may occur from numerous causes. As an example, when light units are attached to the ceiling, heat therefrom is introduced to the enclosure at the units causing "hot spots." If the light unit is mounted flush in the ceiling, that portion wherein the fixture is attached cannot be used for air distribution into the enclosure, resulting in non-uniform distribution of air. If the fixture extends below the ceiling, air will be deflected therefrom resulting in a further disturbance of the desired uniform distribution of air and radiant energy will be directed from the light units to surfaces directly below them.

Summary of the invention

An improvement for environmentally controlled enclosures is provided in which a light transmitting ceiling having spaced openings therein forms the lower boundary of a plenum chamber. Light units mounted above the ceiling provide illumination for the enclosure and eliminates the problem of localized "hot spots" of lights mounted within the enclosure itself.

Heat conducting material, forming the upper boundary of the plenum chamber, assists in distributing heat from the lights evenly within the plenum chamber wherein air flow within the plenum chamber picks up equal amounts of heat throughout the chamber so as to be at a uniform temperature as it flows through the spaced openings in the ceiling and into the enclosure.

Brief description of the drawing

In the accompanying drawings

Description of the preferred embodiment

Figure 1:
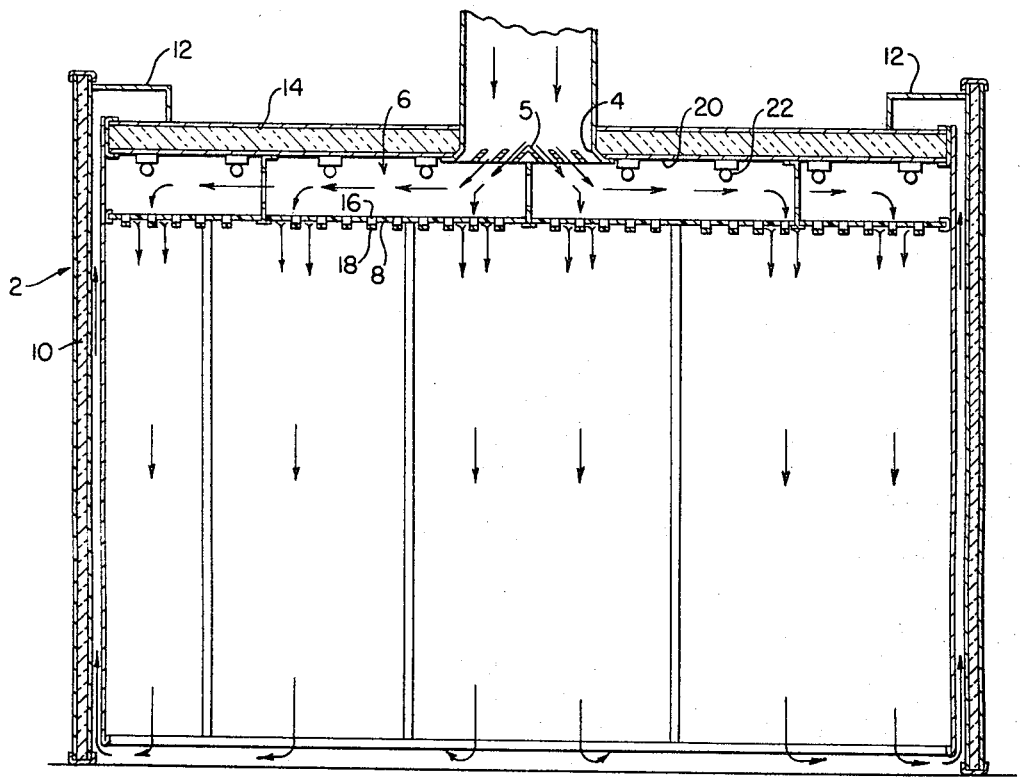
FIG. 1 is a cross sectional view of an illustrative enclosure embodying the present invention.

An embodiment of the present invention used in conjunction with an environmentally controlled enclosure of the type disclosed in Mahlmeister Patent 3,115,819, is shown in FIG. 1 for illustrative purposes.

An enclosure indicated generally at 2 is shown in which environmentally conditioned air is supplied under pressure from an air conditioner, not shown, through suitable ducts to an air supply vent 4, having an air diffusing element 5, into a plenum chamber 6, and through a perforated ceiling 8 for uniform distribution throughout the entire enclosure. The wall sections 10 have vertical passages defined therein to allow the air flow up through the wall sections to return air ducts 12 for recirculation through the air conditioning unit. Although air return is through the wall in the illustrative embodiment, it is apparent that other types of air exit systems and return may be used.

Ceiling 8, composed of a light transmitting material such as translucent plastic but not limited thereto, forms the lower boundary of plenum chamber 6. Ceiling 8 is supported in any suitable fashion below an insulated panel 14 which forms the upper boundary of the plenum chamber. Panel 14 and ceiling 8 are secured to wall sections 10 in any suitable manner so as to completely define plenum chamber 6.

The interior surface of panel 14 is covered with a metallic heat conducting material 20, such as aluminum, upon which are mounted a plurality of lighting units 22. These units are preferably a "strip" type light unit of fluorescent lights but not limited thereto and may be spaced above the ceiling 8 by substantially the depth of the plenum chamber and so spaced throughout plenum chamber 6 to provide equal illumination and heating throughout. The enclosure is uniformly illuminated through ceiling 8 from the light units 22 mounted within the plenum chamber. This arrangement effectively eliminates "hot spots" within the enclosure interior arising from light units such as would occur if the lights were mounted within the enclosure itself.

Within the plenum chamber, the heat conducting surface 20 will absorb and distribute heat from light units 22 uniformly over the entire upper plenum chamber boundary surface providing a beneficial feature to be described herebelow.

Air supply vent 4 is centrally mounted in panel 14 so as to be in communication with plenum chamber 6. Diffusing element 5, which is mounted in vent 4, provides, in this embodiment, for a uniform distribution of air flow into the plenum chamber. Although a single vent is illustrated herein, additional vents may be used so long as the combined result provides for a uniform distribution of air flow throughout the plenum chamber. Thus, the air flow is uniformly distributed throughout the entire plenum chamber 6 and picks up uniform amounts of heat from the light units 22 and radiant energy from ceiling 8 and heat conducting material 20. In this manner, temperature within the plenum chamber will be substantially uniform throughout.

Ceiling 8 contains a plurality of spaced openings 16 therein to permit the air coming from vent 4 to pass therethrough for distribution into the interior of the enclosure. In the preferred embodiment of the present invention, ceiling 8 is a perforated ceiling and is preferably divided into a number of sections for ease of handling in assembling and disassembling of the enclosure.

Figure 2:
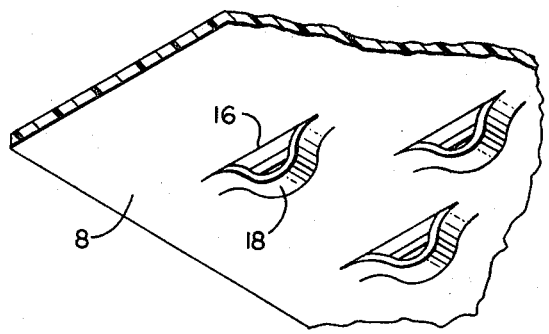
FIG. 2 is a perspective view of a portion of the ceiling.

FIG. 2 is a perspective view of a portion of ceiling 8 as seen from the interior of enclosure 2 particularly showing air deflecting elements 18, one of which is associated with each opening 16. Thus, as air flows through openings 16, the air is deflected providing a further diffusion and distribution of air into the enclosure interior.

Figure 3:
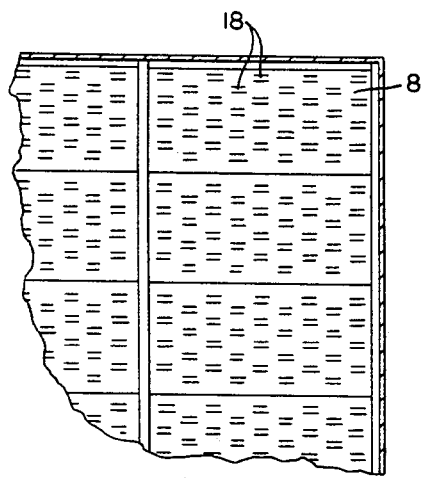
FIG. 3 is a view looking up at a portion of the ceiling.

FIG. 3 is a partial view of ceiling 8 illustrating the approximate configuration and extent of the openings and deflecting element of the perforated ceiling. The number and size of openings and associated deflecting elements is dependent upon the volume of the interior of the enclosure, the temperature requirements and the type of work to be carried on within the enclosures, i.e. whether or not heat generating machinery will be used therein, the number of people working in the enclosure, etc.

A small amount of radiant heat from the lighting units 22 will be absorbed by ceiling 8 and distributed uniformly throughout. Air flow from the plenum chamber and through the perforated ceiling 8 will pick up uniform amounts of heat as it flows through the ceiling at each opening. Since the openings 16 are uniformly spaced over the entire ceiling area, it is seen that air is distributed for uniform flow into the enclosure and will flow into the enclosure at a uniformly constant temperature from the entire ceiling area.

Thus, in operation, when the enclosure 2 is ready for use, environmentally conditioned air is forced from an air conditioning unit into vent 4 in the panel 14 forming the upper boundary of a plenum chamber 6. The air will then flow through diffusing element 5 for uniform distribution throughout the entire chamber between panel 14 and the inner ceiling 8. This uniform blanket of air picks up heat from lighting units 22 and heat conducting surfaces 20 in uniform amounts and will then flow through openings 16 in ceiling 8 to enter the enclosure at a constant temperature and descend through the interior of the enclosure until reaching exhaust means in the bottom of the inner wall panels adjacent the floor of the enclosure. The air will then be drawn into and up through the vertical passages between the inner and outer wall panels and will empty into return ducts 12. The air is then circulated throughout duct 12 which is operably connected to the air conditioning unit. In this manner, the conditioned air is uniformly and thoroughly distributed throughout the entire volume of the enclosure, thereby eliminating any "hot spots" or "cold spots" generally caused by having only a single or a few widely spaced air outlets in a room.

In addition, with lighting units mounted in the plenum chamber, and using light transmitting ceilings, uniform illumination of the enclosure is obtained while eliminating the problems of localized "hot spots" and non-uniform distribution of air over the entire enclosure.

While the form of apparatus herein described constitutes a preferred embodiment of the invention, it is to be understood that the invention is not limited to this precise form of apparatus, and that changes may be made therein without deparing from the scope of the invention which is defined in the appended claims.

What is claimed is:

1. In an environmentally controlled enclosure of the type in which air of precisely controlled temperature introduced into a plenum chamber above the enclosure is uniformly distributed through the enclosure wherein the improvement for distributing air and uniformly controlling radiant heat from lighting units comprises, an insulated panel covered by a heat conductive metallic surfacing forming the upper boundary of the plenum chamber wherein said metallic surfacing forms the upper surface of said plenum chamber, a light transmitting ceiling forming the lower boundary of the plenum chamber and provided with a plurality of spaced openings for the diffused distribution of air into the enclosure, a plurality of strip lighting units mounted in said plenum chamber on said heat conducting metallic surfacing and spaced above said ceiling by substantially the depth of said plenum such that said enclosure is uniformly illuminated through said ceiling and heat from said light units is uniformly distributed throughout said plenum chamber by said heat conducting metallic surfacing, and air supply means supplying temperature conditioned air into and throughout said plenum chamber for diffused distribution downward through said ceiling wherein said air picks up uniform amounts of heat from said heat conducting means and light means and said air stream flowing through said ceiling openings further picks up radiant heat absorbed by said ceiling whereby air uniformly enters the enclosure beneath said ceiling at a constant controlled temperature.

2. In an environmentally controlled enclosure of the type in which air of precisely controlled temperature introduced into a plenum chamber above the enclosure is uniformly distributed throughout the enclosure, wherein the improvement for distributing air and uniformly controlling radiant heat from light units comprises, a light transmitting ceiling forming the lower boundary of the plenum chamber and provided with a plurality of spaced openings therein, said spaced openings providing for the diffused distribution of air into the enclosure, an air deflecting element associated with each of said spaced openings in said ceiling providing a further diffusion and distribution of air flowing into said enclosure, an insulated panel covered by a heat conducting metallic surfacing forming the upper boundary of the plenum chamber wherein said metal surfacing forms the upper surface of said plenum chamber, a plurality of strip lighting units mounted on said panel and against said metallic surfacing and spaced above said ceiling by substantially the depth of said plenum such that said enclosure is uniformly illuminated through said ceiling and heat from said units is uniformly distributed throughout said plenum chamber by said metallic surfacing, an air supply vent centrally mounted in said panel, diffuser means mounted in said vent providing evenly diffused air flow throughout said plenum chamber, and air supply means communicating with said vent for supplying temperature controlled air into and throughout said plenum chamber for diffused distribution downward through said ceiling, wherein said air picks up equal amounts of heat from said metallic surfacing and said strip light units and said air stream flowing through said ceiling openings and past said deflecting elements further picks up radiant heat absorbed by said ceiling and said deflecting elements whereby air uniformly enters the enclosure beneath said ceiling at a constant controlled temperature.

References Cited

UNITED STATES PATENTS

| | | | |
|---|---|---|---|
| 2,730,942 | 1/1956 | Peterson | 98—40 |
| 2,902,918 | 9/1959 | Swarner | 98—40 X |
| 2,956,150 | 10/1960 | Schwartz et al. | 98—40 X |
| 3,115,819 | 12/1963 | Mahlmeister et al. | 98—40 |
| 3,303,771 | 2/1967 | Nesher et al. | 98—40 |

ROBERT A. O'LEARY, Primary Examiner.

W. E. WAYNER, Assistant Examiner.